R. MURAUER.
VALVE GEAR FOR ENGINES.
APPLICATION FILED MAY 27, 1911.

1,062,843.

Patented May 27, 1913.

3 SHEETS—SHEET 1.

Witnesses:
Eugene Weying
[signature]

Inventor
Rudolf Murauer
by [signature]
his Attorney

R. MURAUER.
VALVE GEAR FOR ENGINES.
APPLICATION FILED MAY 27, 1911.

1,062,843.

Patented May 27, 1913.
3 SHEETS—SHEET 2.

Witnesses:—
Eugene Wiring
Louise Franck

Inventor
Rudolf Murauer
by his Attorney

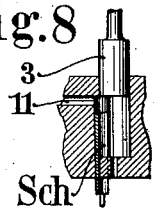
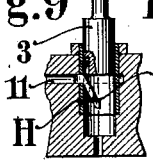
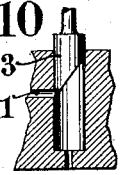
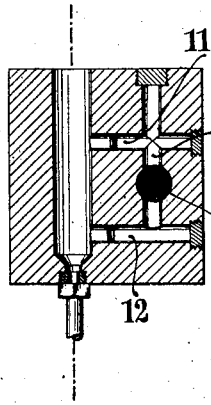
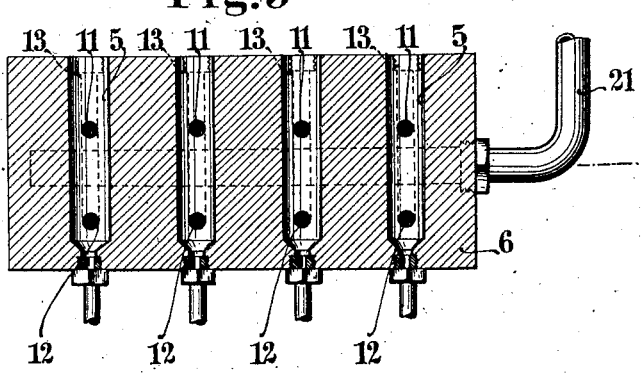
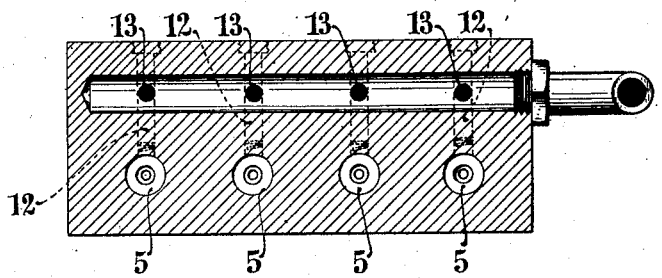

UNITED STATES PATENT OFFICE.

RUDOLF MURAUER, OF KLAGENFURT, AUSTRIA-HUNGARY.

VALVE-GEAR FOR ENGINES.

1,062,843.  Specification of Letters Patent.  Patented May 27, 1913.

Application filed May 27, 1911. Serial No. 629,882.

*To all whom it may concern:*

Be it known that I, RUDOLF MURAUER, engineer, a subject of the Emperor of Austria-Hungary, residing at Klagenfurt, in Kärnten, Austria-Hungary, have invented certain new and useful Improvements in Valve-Gear for Engines, of which the following is a specification.

This invention has reference to a valve-gear for engines, machines for working materials and the like, in which the movement of the distributing part is obtained by arranging a column of liquid between the valve and the part actuating the same, that is to say the cam disk, cam shaft and the like. If a piston is moved through a certain course in a closed pipe containing liquid, then owing to the practical incompressibility of liquids, a second piston, situated at the other end of the pipe, will be moved forward through exactly a similar course owing to the pressure of the liquid, provided of course that both pistons are of the same cross-section. The inexactitudes, which are occasioned by losses of liquid in the pipe can be compensated by causing the column of liquid, when exposed to atmospheric pressure, to communicate with a reserve supply of liquid which automatically replaces the quantity of liquid lost.

The present invention is based on the combination of these individually known facts for attaining a definite purpose and according to the present invention one or more of these columns of liquid can be shut off, by means of connecting the columns of liquid with a pipe exposed to atmospheric pressure for the purpose of being able to reverse without overcoming the spring pressure of the valves as well as to maintain an equal quantity of liquid in the pipe transmitting the pressure of the piston.

I shall now describe my invention with reference to the accompanying drawing showing different forms of construction in which:—

Figure 1:
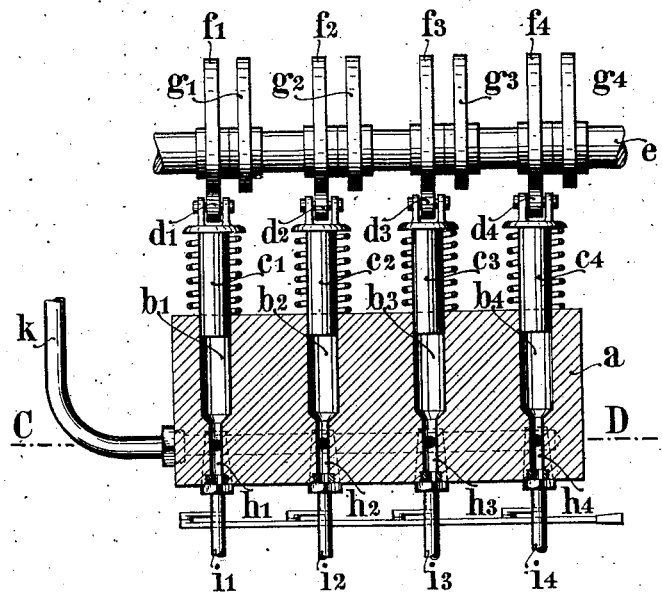
Figure 2:
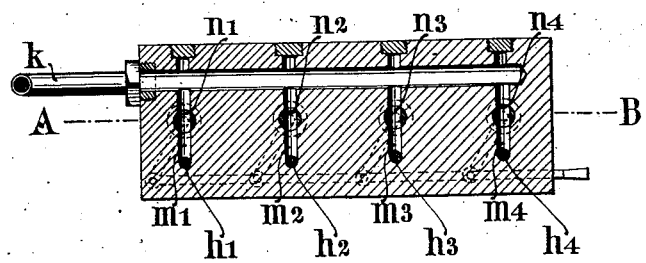
Figure 3:
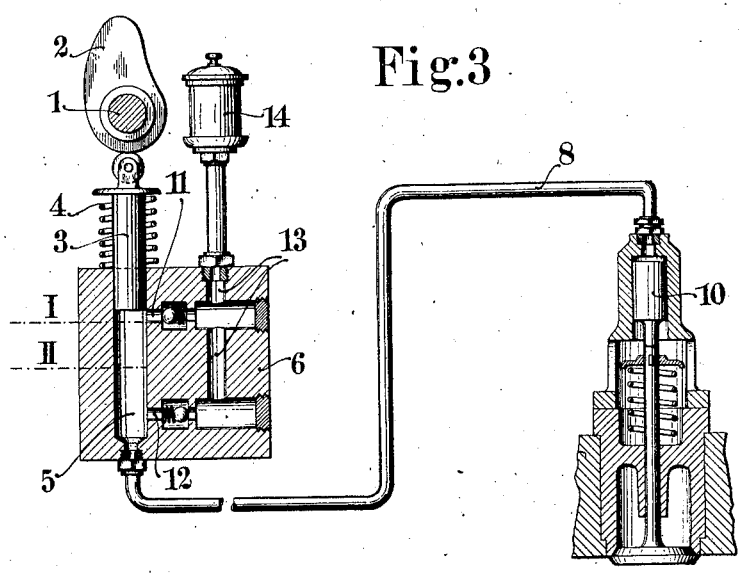
Figure 4:
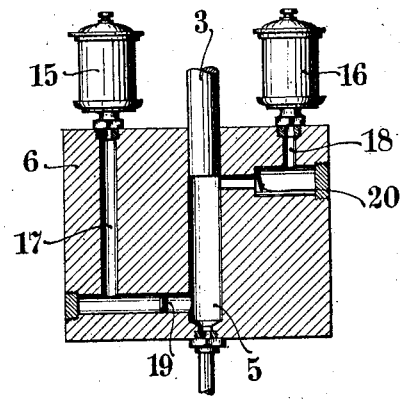

Figure 1 is a sectional front elevation of the valve gear according to the invention on the line A—B of Fig. 2 which is a plan view in section on the line C—D of Fig. 1. Figs 3 and 4 show a further modification with a view to assure the precision of the liquid valve-gear. Figs. 5, 6 and 7 are sectional front and side elevations and plan view respectively of the modification according to Fig. 1 showing the application to several valves. Figs. 8, 9 and 10 show various modifications for permitting of varying the length of the intermediate column of liquid as desired.

Figs. 1 and 2 of the accompanying drawing show the application of the arrangement to a Diesel engine especially to reversing engines. The reversing of engines, more particularly of internal combustion engines, is effected either by employing two sets of cam disks (eccentrics), of which one serves for the forward rotation and the other set for the reversing rotation or the cam disk, eccentrics or the like are turned through a certain angle. In both cases the levers with their rollers actuating the valve gear mechanism press with the spring pressure of the valves on the cam disks, and when moving or turning the distributing parts this spring pressure must be overcome in order to lift away the rollers and give a free passage to the cam disks beneath the same. This disadvantage is particularly noticeable in the case of large engines with powerful springs, in which considerable force is necessary to press in the valves. Consequently it is necessary to provide complicated devices for this purpose, which can be avoided according to the present invention. According to this invention the columns of liquid connecting the valves with their actuating parts are so arranged that they can be made to communicate with a pipe exposed to atmospheric pressure. It is thus possible to interrupt the positive connection of the distributing part with the valve and thus permit an easy displacement or turning of the distributing parts beneath the actuating rollers.

A modification of the invention is shown in Figs. 1 and 2. Borings $b^1$, $b^2$, $b^3$, and $b^4$ provided with pistons $c^1$, $c^2$, $c^3$ and $c^4$ are formed in a common part $a$. On the ends of the pistons $c^1$—$c^4$ projecting from the part $a$, rollers $d^1$—$d^4$ are mounted and coöperate with the cam disks $f^1$—$f^4$ or $g^1$—$g^4$ situated on the distributing shaft $e$. The borings $b^1$—$b^4$ communicate through channels $h^1$—$h^4$ with pipes $i^1$—$i^4$, which lead to the various valves to be actuated. A liquid column is arranged between each of the pistons $c^1$—$c^4$ and the valves, thereby effecting a positive transmission of movement from the cam disks to the valves. The cam disks $f^1$—$f^4$ are for forward rotation and the cam disks $g^1$—$g^4$, for backward rotation, the reversing being effected by axial displacement of the distributing shaft $e$, so that instead of the cam disks $f^1$—$f^4$, it will be the cam disks $g^1$—$g^4$ that will contact with the rollers. According to the present invention in order to be able to effect the displacement without pressing in the valves, the arrangement is such that all the channels containing the columns of liquid can be made to communicate with a pipe exposed to atmospheric pressure. In this manner the rollers $d$ of one set can be removed from the cam disks without any effort and the distributing shaft can be displaced or the cam disks can be turned through the necessary angle for reversing the engine. According to the construction shown a single side pipe $k$ is provided which communicates through channels $m^1$—$m^4$ with the corresponding channels $h^1$—$h^4$. At the connection spots tap-plugs $n^1$—$n^4$ are provided, the levers of which can be actuated by a common connecting rod $o$. By means of the connecting rod $o$ the channels $h^1$—$h^4$ can be connected to or cut off from the channel $k$ exposed to atmospheric pressure. If the plugs $m^1$—$m^4$ are closed then the pistons will be positively connected to the valves and the movements of the pistons $c^1$—$c^4$ will be positively transmitted by the cam disks to the valves.

According to the modification shown in Figs. 3–7 the arrangement is such that the precision of the intermediate columns of liquids is reliably maintained.

In the modification shown in Fig. 3 it will be seen that the cam disk mounted on the shaft 1 acts on a piston which is pressed by a spring 4 against the cam disk. The piston 3 works in the boring 5 of the part 6 provided with channels and valves for maintaining the necessary positive connection of the columns of liquid and for increasing the precision of the same in accordance with the present invention. Just as in Fig. 1 the pipe 8 leads to the valve to be operated. As will be perceived from Fig. 5 the boring 5 in the part 6 communicates with a side channel 13 by means of two short channels 11 and 12. The channel 13 communicates with a collecting vessel 14. The working stroke of the piston 3 is from I—II, that is to say the valve must be actuated, correspondingly to the cross-sections of both the pistons 3 and 10, from the moment in which the piston 3 has shut off the channel 11. The stroke of the piston is dependent on the shape of the cam disk. A stop valve is provided in the channel 11 through which on the inward movement of the piston 3 any excess of liquid present in the boring 5 will pass through the channels 11 and 13 to the collecting vessel 14. In the channel 12, which is situated beneath the lowest position 11 of the piston 3, a suction valve is provided, which is closed on the inward movement of the piston so that the pipe 8 is positively connected to the valve 7, whereas on the outward movement of the piston 3 liquid will be sucked in from the collecting vessel 14 through the channels 13 and 12 and on the next inward movement of the piston so much liquid will be pressed out through the stop-valve in the channel 11 until the positively geared position is obtained with absolute precision. In this manner the losses of liquid on each stroke of the piston are automatically compensated. Thus it is always the same quantity of liquid that is employed and it is only necessary from time to time to supply the collecting vessel 14 with the quantity of liquid necessary for compensating the losses which unavoidably arise in the course of time, for example by evaporation.

The modification shown in Fig. 4 differs from that in Fig. 3 in that two collecting vessels 15, 16 are provided which communicate, by means of special channels 17 and 18, with the boring 5 of the part 6, in which the piston 3 slides to-and-fro. A suction valve 19 is provided in the channel 17 and a stop valve 20 in the channel 18. According to this modification on each stroke of the piston a certain quantity of liquid corresponding to the stroke of the piston is sucked from the collector 15 and on the downward movement of the piston is forced into the second vessel 16. In this case consequently the column of liquid is gradually substituted by fresh liquid, this being effected at a speed corresponding to the length of the stroke of the piston. This constitutes a great advantage, more particularly in the case of rapidly rotating engines, because the column of liquid under pressure will in the course of time be considerably heated, and this is effectively avoided by the gradual substitution of cold liquid. If oil is used as liquid then the engine may be lubricated from the collector 16 with the excess of oil.

The modification shown in Figs. 5, 6 and 7 shows the arrangement of several valves or manipulating parts for the same. In this case borings 5 corresponding to the number of valves are formed in a common part 6, in which borings the respective pistons slide. Pipes 11 and 12, each provided with a stop or suction valve, are branched off laterally from the borings 5 and communicate with each other by means of a connecting channel 13. A collecting channel 21 is common to all the channels 13 and leads to a common collecting vessel. This modification may also be provided with two collecting vessels corresponding to the form of construction shown in Fig. 4. The precision of the column of liquid can also be obtained by dispensing with the channel 11 with the stop valve and arranging a commanded cut-off or the like in the channel 12. In this case the distribution can be effected in any desired manner. The quantity of liquid sucked in or forced out and consequently the quantity of liquid remaining in the connecting channel can be exactly regulated by the earlier or later closing of the cut-off part by the valve-gear.

By varying the moment at which the piston closes the channels it is possible also to determine the length of the stroke, and the moment and duration of opening of the corresponding valve. The further down the channel 11 (Figs. 3, 4, 5 and 6) is situated the later and shorter will the valve be opened. A few of these modifications are diagrammatically shown in Figs. 8, 9 and 10. According to Fig. 8 this is effected by varying the position of the slide Sch, according to Fig. 9 by turning the socket H with its slot $q$ and according to Fig. 10 by turning the piston itself, owing to its beveled end.

The above described arrangement of the controlled cut-off part in the channel leading to the reserve liquid can also be employed for varying the moment and duration of opening and the stroke of the corresponding valve, because with corresponding valve gear of the said cut-off part the effective length of the intermediate column of liquid can be varied as desired.

Having now particularly described the nature of my said invention and in what manner the same is to be performed I declare that what I claim is:—

1. Valve controlling mechanism for engines, embodying therein a supporting member provided with a bore containing a liquid column, a piston arranged to act against one end of said liquid column, valvular means in operative relation to the opposite end of said liquid column, means for actuating the piston, and means whereby the pressure of said liquid column may be varied to permit reverse movement of said mechanism.

2. Valve controlling mechanism for engines, embodying therein a supporting member provided with a bore containing a liquid column, a piston arranged to act against one end of said liquid column, valvular means in operative relation to the opposite end of said liquid column, means for actuating the piston, and means whereby said liquid column may be placed in communication with atmosphere to modify the pressure of said liquid column.

3. Valve controlling mechanism for engines, embodying therein a supporting member provided with bores each containing a liquid column, a piston arranged to act against one end of each of said liquid columns, valvular means in operative relation to the opposite end of each of said liquid columns, means for actuating the pistons, and a pipe common to and connected with said several liquid columns, said pipe communicating with atmosphere whereby said several liquid columns may be placed in communication with atmosphere to modify the pressure thereof.

4. Valve controlling mechanism for engines, embodying therein a supporting member provided with bores each containing a liquid column, a piston arranged to act against one end of each of said liquid columns, valvular means in operative relation to the opposite end of each of said liquid columns, means for actuating the pistons, a pipe common to and connected with said several liquid columns, said pipe communicating with atmosphere whereby said several liquid columns may be placed in communication with atmosphere to modify the pressure thereof, and means whereby each of said liquid columns may be caused to communicate independently of the other liquid columns with said pipe leading to atmosphere.

5. Valve controlling mechanism for engines, embodying therein a supporting member provided with bores each containing a liquid column, a piston arranged to act against one end of each of said liquid columns, valvular means in operative relation to the opposite end of each of said liquid columns, means for actuating the pistons, means whereby the pressure of said liquid columns may be varied to permit reverse movement of said mechanism, and means whereby the liquid in each of said columns is maintained substantially constant in quantity.

6. Valve controlling mechanism for machines, embodying therein a supporting member provided with a bore containing a liquid column, a piston adapted to act against one end of said liquid column, an eccentric acting against said piston, valvular means in operative communication with the opposite end of said liquid column, means whereby said column may be placed into and out of communication with atmosphere, and means for automatically replacing the liquid in said column by fresh liquid.

7. Valve controlling mechanism for engines, embodying therein a supporting member provided with a plurality of bores each thereof containing a liquid column, a pipe communicating with atmosphere and connected to each of the bores containing liquid, a piston operable in each of said bores, means for actuating said pistons, means leading from said bores to valvular controlling means, means whereby each of said bores may be independently connected with said pipe leading to atmosphere, and means whereby all of said bores may be simultaneously connected to said pipe leading to atmosphere.

In testimony whereof I affix my signature in presence of two witnesses.

RUDOLF MURAUER.

Witnesses:
RUDOLF THEUMER,
AUGUST BERRY.